United States Patent
Wang et al.

(10) Patent No.: US 11,816,741 B2
(45) Date of Patent: *Nov. 14, 2023

(54) AUTOMATICALLY LABELING DATA USING NATURAL LANGUAGE PROCESSING

(71) Applicant: Futurity Group, Inc., Chicago, IL (US)

(72) Inventors: John Wang, Walnut Creek, CA (US); Hari Nathan, New York, NY (US)

(73) Assignee: Futurity Group, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,792

(22) Filed: Dec. 30, 2022

(65) Prior Publication Data

US 2023/0140026 A1    May 4, 2023

Related U.S. Application Data

(63) Continuation of application No. 17/666,001, filed on Feb. 7, 2022, now Pat. No. 11,544,795.
(Continued)

(51) Int. Cl.
*G06F 17/00* (2019.01)
*G06Q 40/08* (2012.01)
(Continued)

(52) U.S. Cl.
CPC .............. *G06Q 40/08* (2013.01); *G06F 16/35* (2019.01); *G06F 40/205* (2020.01); *G06F 40/40* (2020.01)

(58) Field of Classification Search
CPC ........ G06Q 40/08; G06Q 10/10; G06F 16/35; G06F 40/205; G06F 40/40; G06F 16/3329; G06F 40/30; G06F 40/284
See application file for complete search history.

(56) References Cited

U.S. PATENT DOCUMENTS 9,792,656 B1    10/2017  Konrardy et al.
10,007,717 B2    6/2018  Zhang et al.
(Continued)

FOREIGN PATENT DOCUMENTS

KR    20190063175    6/2019
WO    2020139917    7/2020

OTHER PUBLICATIONS

Ai, Jing, Patrick L. Brockett, and Linda L. Golden. "Assessing consumer fraud risk in insurance claims: An unsupervised learning technique using discrete and continuous predictor variables." North American Actuarial Journal 13.4 (2009): 438-458 (Year: 2009).*
(Continued)

*Primary Examiner* — Andrew T McIntosh
(74) *Attorney, Agent, or Firm* — Gardella Grace P.A.

(57) ABSTRACT

In an illustrative embodiment, methods and systems for automatically labeling unstructured data include accessing unstructured data representing data entry and analyzing the unstructured data by applying natural language processing to a text component of the unstructured data to obtain a set of term counts of words and/or phrases identified in the text component. Analyzing may include applying at least one clustering algorithm to the set of term counts to determine a term cluster, identifying a preexisting term cluster most closely matching the term cluster, and applying, to the unstructured data, a predefined label corresponding to the preexisting term cluster. The unstructured data may be analyzed to obtain formatting counts of formatting elements, and a formatting cluster may be determined and applied to match to a preexisting formatting cluster, thus deriving a predefined label corresponding to the preexisting formatting cluster.

20 Claims, 8 Drawing Sheets

Related U.S. Application Data

(60) Provisional application No. 63/147,348, filed on Feb. 9, 2021.

(51) Int. Cl.
  *G06F 16/35* (2019.01)
  *G06F 40/40* (2020.01)
  *G06F 40/205* (2020.01)

(56) References Cited

U.S. PATENT DOCUMENTS

| | | |
|---|---|---|
| 10,133,727 B2 | 11/2018 | Karres et al. |
| 10,332,210 B1 | 6/2019 | Kemp et al. |
| 10,977,738 B2 | 4/2021 | Wang et al. |
| 11,605,465 B1* | 3/2023 | Larson .................. G16H 50/30 |
| 11,621,085 B1* | 4/2023 | Gottula .................. H04L 67/34 706/11 |
| 11,625,789 B1* | 4/2023 | Drouin .................. G06F 17/18 706/12 |
| 2002/0161763 A1* | 10/2002 | Ye .......................... G06F 21/55 |
| 2003/0028404 A1 | 2/2003 | Herron et al. |
| 2006/0026157 A1 | 2/2006 | Gupta et al. |
| 2011/0125648 A1 | 5/2011 | Price et al. |
| 2013/0151238 A1 | 6/2013 | Beaurpere et al. |
| 2014/0129560 A1* | 5/2014 | Grokop ................ G06F 16/285 707/737 |
| 2015/0081324 A1 | 3/2015 | Adjaoute |
| 2015/0127370 A1 | 5/2015 | Cornelis |
| 2015/0205863 A1 | 7/2015 | Drennan, III |
| 2015/0254555 A1* | 9/2015 | Williams, Jr. ......... G06N 3/045 706/14 |
| 2016/0012544 A1 | 1/2016 | Ramaswamy et al. |
| 2016/0314184 A1* | 10/2016 | Bendersky .............. G06F 16/35 |
| 2018/0165758 A1 | 6/2018 | Saxena et al. |
| 2019/0065459 A1 | 2/2019 | Andrews et al. |
| 2019/0279306 A1 | 9/2019 | Wassel et al. |
| 2020/0118014 A1 | 4/2020 | Kasturi et al. |
| 2020/0211120 A1 | 7/2020 | Wang et al. |
| 2020/0272938 A1 | 8/2020 | Desmond et al. |
| 2020/0364572 A1* | 11/2020 | Senn ...................... G06N 3/045 |
| 2020/0394364 A1 | 12/2020 | Venkateshwaran et al. |
| 2022/0019730 A1 | 1/2022 | Sharma et al. |
| 2022/0253942 A1 | 8/2022 | Wang et al. |

OTHER PUBLICATIONS

International Search Report and Written Opinion for International Application No. PCT/US2019/068531 dated Mar. 11, 2020. (Submitted in related U.S. Appl. No. 17/666,001).

Rodriguez et al., "Clustering by fast search and find of density peaks", Science, Jun. 27, 2014, vol. 344, Issue 6191, pp. 1492-1496. (Submitted in related U.S. Appl. No. 17/666,001).

Extended European Search Report dated Jul. 8, 2022 in related European Application No. 22155574.1, 9 pages. (Submitted in related U.S. Appl. No. 17/666,001).

Non-Final Office Action dated Apr. 27, 2022 in related U.S. Appl. No. 17/666,001. (Submitted herewith).

Notice of Allowance dated Aug. 11, 2022 in related U.S. Appl. No. 17/666,001. (Submitted herewith).

Agarwal et al., "Automatic problem extraction and analysis from unstructured text in IT tickets," IBM Journal of Research and Development, 61.1 (2017):4:41-52. (in related U.S. Appl. No. 17/666,001).

Paramesh et al., "Classifying the unstructured IT service desk tickets using ensemble of classifiers," 3rd International Conference on Computational Systems and Information Technology for Sustainable Solutions (CSITSS), IEEE, 2018, 7 pages. (in related U.S. Appl. No. 17/666,001).

U. Srinivasan and B. Arunasalam, "Leveraging Big Data Analytics to Reduce Healthcare Costs," in IT Professional, vol. 15, No. 6, pp. 21-28, Nov.-Dec. 2013. (Year: 2013).

Notice of Allowance mailed in related case U.S. Appl. No. 17/192,373, dated Feb. 8, 2023.

* cited by examiner

FIG. 3

AUTOMATICALLY LABELING DATA USING NATURAL LANGUAGE PROCESSING

RELATED APPLICATIONS

This application claims priority to U.S. patent application Ser. No. 17/666,001, entitled "Automatically Labeling Data using Natural Language Processing" and filed Feb. 7, 2022, (now U.S. Pat. No. 11,544,795) which claims priority to U.S. Provisional Patent Application Ser. No. 63/147,348, entitled "Automatically Labeling Data using Natural Language Processing" and filed Feb. 9, 2021.

This application is related to the following prior patent applications: U.S. patent application Ser. No. 16/720,460, entitled "Systems, Methods, and Platforms for Automated Quality Management and Identification of Errors, Omissions and/or Deviations in Coordinating Services and/or Payments Responsive to Requests for Coverage under a Policy," filed Dec. 19, 2019 (now U.S. Pat. No. 10,977,738). All above identified applications are hereby incorporated by reference in their entireties.

BACKGROUND

Complex insurance claims have historically been monitored manually, resulting in oversights and errors that can lead to financial loss, reduction in customer satisfaction, and frustration for processing agent teams. Because of the overwhelming amount of information, oversight and review of the claims process by supervisors of processing agents has typically been spotty, and selection of which individual claims to review has involved the supervisor's subjective belief, or intuition, on which claims are most likely to lead to complications and/or loss as well as coarse objective measures such as reserve amount or review checklists. The claims financial improvement opportunity of an average insurer is typically 8-12% of claims loss and allocated loss adjustment expenses (ALAE) costs, depending on the line of business. However, to date, insurers have had limited strategies or knowledge on how to reduce financial improvement opportunity. The inventors recognized a need for automated, objective analysis of claims handling, while the claims are still being processed, to identify potential monetary or customer satisfaction losses and to activate automatic and/or manual interventions to stem or avert loss.

SUMMARY OF ILLUSTRATIVE EMBODIMENTS

In one aspect, the present disclosure describes methods, systems, and a platform for assessing and analyzing the quality of claims handling relative to best practices. The methods and systems may be applied, for example, to provide front line and executive management of insurance companies with the tools and resources needed to drive continuous, measurable improvement in claim handling behaviors and claim outcomes.

In one aspect, the present disclosure describes methods, systems, and a platform for identifying high risk claims during the claims processing cycle. The methods and systems described herein can be used to identify handling patterns and best practice deviations resulting in opportunities for improvement in customer service, operational efficiency, and indemnity results. By identifying potential problems, resources may be delegated to assess the claims handling process and to avert losses.

In support of assessing claims handling, in some implementations, unstructured data portions of information attached to claims are analyzed to automatically apply labels identifying information types, actions taken, and/or follow-up tasks to be performed. The unstructured data portions, in some examples, can include claims agent notes, legal documents, photos, invoices, police reports, and other documentation related to claims processing. Natural language processing techniques can be applied to the unstructured data portions to analyze the content in view of formatting and/or terminology used. For example, one or more clustering algorithms may be applied to format, word, and/or phrase counts to compare a given unstructured data portion to other, labeled, unstructured data portions to find matches and, optionally, near matches or close similarity between cluster analysis of a given unstructured data portion and previously labeled unstructured data.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 3 is an example data entry screen for capturing an unstructured data portion;

DETAILED DESCRIPTION OF ILLUSTRATIVE EMBODIMENTS

Figure 1:
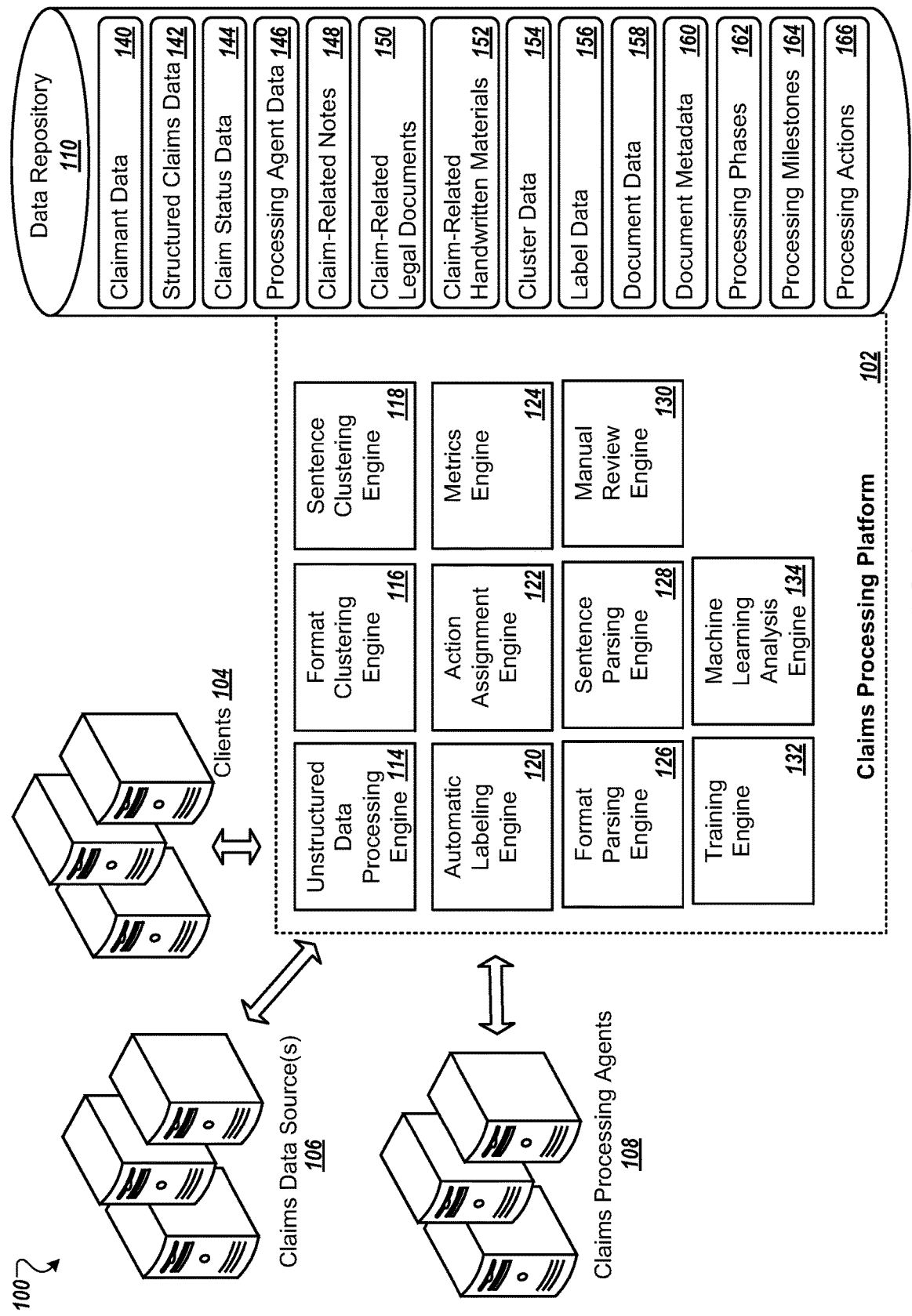
FIG. 1 is a block diagram of an example system for applying natural language processing to automatically label unstructured data within an insurance claims environment.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

FIG. 1 is a block diagram of an example system 100 for applying natural language processing to automatically label unstructured data within an insurance claims environment. In some implementations, a claims processing platform 102 includes a number of software programs, algorithms, routines, or other computer logic-implemented features, referred to generally as "engines", for processing claims information and applying labels to unstructured data portions so that actions associated with the labels can be tracked, assigned, or followed up on with claims processing agents 108, for example to ensure that claims processing milestones are adhered to and claims leakage is averted. The claims information may be obtained from one or more claims sources 106, such as notes submitted by the claims processing agents 108, reports submitted by police or other officials, and/or legal documents generated in relation to an insurance claim. A portion of the claims information, in some embodiments, is imported from one or more clients 104. Further, the clients 104 may include supervisors, managers, board members, or other staff involved in processing the claim or overseeing claims processing by the claims agents 108.

In some embodiments, the claims information and other data is stored in a data repository 110 that may include one or more data stores, cloud-based data pools, databases, or other non-transitory computer readable storage mediums for collecting and storing various types of files and other information.

Turning to the claims processing platform 102, in some implementations, portions of unstructured claims data such as, in some examples, claim-related notes 148, claim-related legal documents 150, and claim-related handwritten materials 152 are provided to an unstructured data processing engine 114 for analyzing the contents and categorizing the unstructured material. The unstructured data processing engine 114, for example, may coordinate the processing and analysis of the unstructured data portions with other engines of the claims processing platform 102, resulting in data labeling (e.g., via an automatic labeling engine 120) and/or action assignment (e.g., via an action assignment engine 122). In an illustrative example, the unstructured data portions may each represent information regarding what needs to be done (e.g., a follow-up with an insurance company, etc.), what has been done (e.g., information sent to a client, etc.), and/or analysis regarding elements of the insurance claim during the processing cycle of an insurance claim.

In some implementations, the unstructured data processing engine 114 conducts pre-processing of the unstructured data portions such as, in some examples, natural language processing (NLP) recognition of handwritten data, text cleaning, recognition of abbreviations, removal of non-alphabet characters or non-alphanumeric characters, conversion into a single verb tense, tokenization, normalization, and/or noise removal. Further, the unstructured data processing engine 114 may convert various types of data sources (e.g., file types) into a single format for further analysis. For example, the unstructured data portions may be transformed into consistent document data 158. If the original document type contained a metadata portion, the unstructured data processing engine 114 may store the metadata as document metadata 160. If the original document is stored in a graphical format (e.g., .pdf file), audio format (e.g., .wav file), or video format (e.g., .mov file), written and/or audible words may be transformed into text for further analysis.

The unstructured data processing engine 114, in some implementations, provides the unstructured data portion(s) to a format clustering engine 116 for formatting analysis. The formatting of unstructured data portion(s), for example, may be useful in identifying unstructured data types that include a consistent structure, such as automatically generated notes, note templates for logging common information, and/or organizational and/or supervisor trained note styles.

Figure 3:
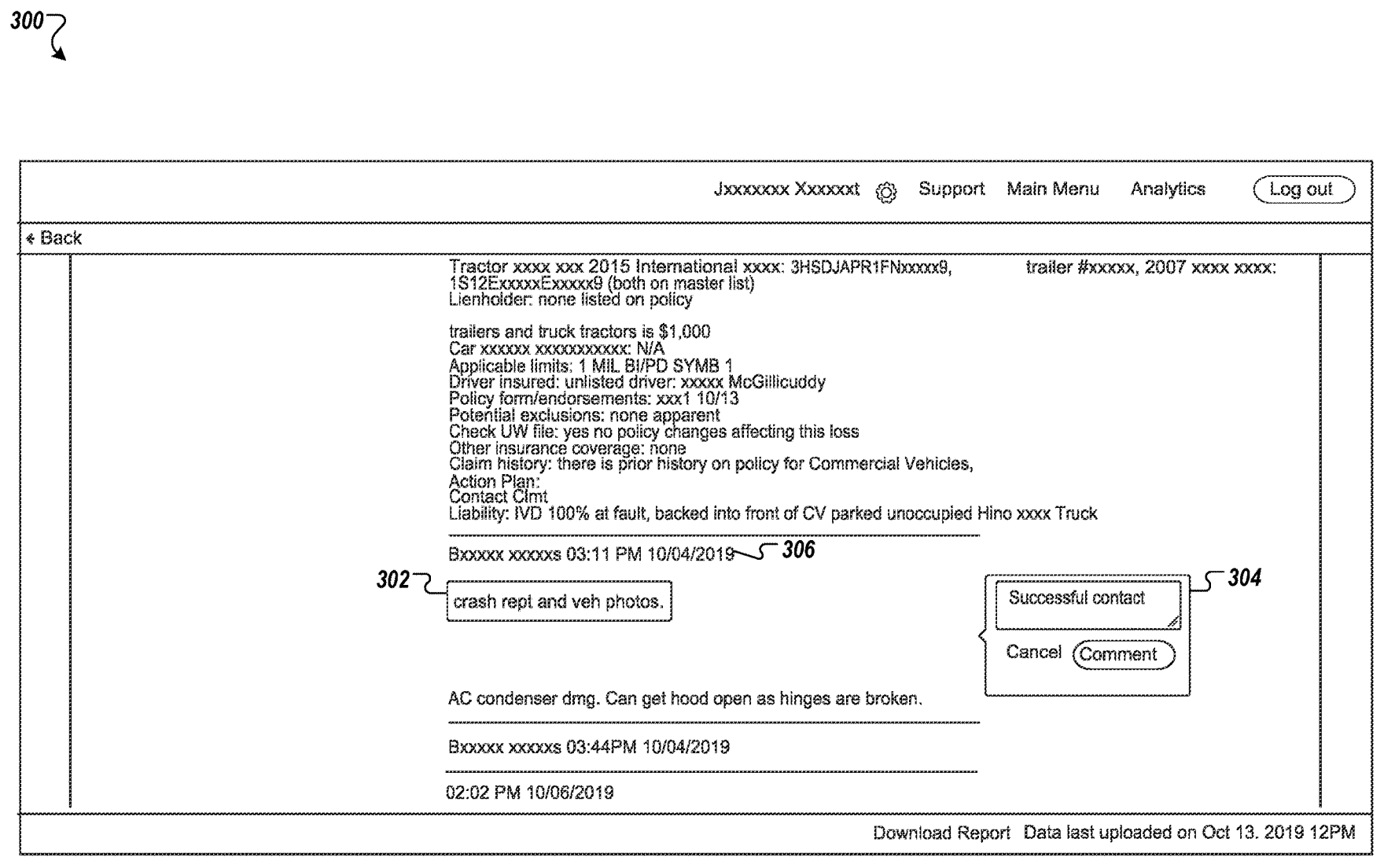

An example user interface 300 for entering a claim note 304 related to an insurance claim is illustrated in FIG. 3. Turning to FIG. 3, the text of the claim note, as illustrated, reads "successful contact" which may be an automatically generated note or an example of standard note content. As illustrated, in addition to the note, the user interface 300 includes addition or upload of a vehicle crash report and associated vehicle photos 302. The vehicle crash report is another example of unstructured data. Each of the claim note 304 and the vehicle report and photos 302 may be associated with an entry date 306. Information regarding a user logged into the user interface 300 may also be associated with the claim note 304 and the vehicle report and photos 302.

Returning to FIG. 1, the format clustering engine 116 may coordinate with a format parsing engine 126 to parse and characterize formatting aspects of the unstructured data portion. The format parsing engine 126, in some examples, may identify patterns in and/or counts of whitespace use (tabs and spaces), carriage returns, bullets, and/or number of characters between bullets and/or carriage returns. For English documents, for example, the format parsing engine 126 may parse the documents from left to right and top down. The format parsing engine 126 may provide a set of formatting data representing the identified patterns and/or counts to the format clustering engine 116.

Using the set of formatting data from the format parsing engine 126, in some implementations, the format clustering engine 116 applies one or more clustering algorithms to match the set of formatting data with a preexisting cluster. For example, clusters provided by a first clustering algorithm may be supplied to a second clustering algorithm to produce more fine-grained cluster information. In another example, different clustering algorithms with different goals (e.g., whitespace clusters vs. bullet and list type formatting clusters) may be executed sequentially or in parallel to analyze the set of formatting data. The preexisting clusters, for example represented by cluster data 154, represent other unstructured data portions suspected of containing similar information based on formatting similarity. The clustering algorithm(s), for example, may include agglomerative clustering, density-based spatial clustering of applications with noise (DBSCAN), or fast density peak clustering (DPeak). The clustering algorithm(s) may additionally consider a distance measure or similarity metric, representing the distance between the formatting of pairs of unstructured data portions and/or the distance between an unstructured data portion and the formatting data of a preexisting cluster. The distance measure may be a Euclidean or cosine distance, for example. In illustration, the distance measure can be varied to identify identical (e.g., standard formatted) notes, highly similar (e.g., template formatted) notes, or closely resembling (e.g., department or organizational trained style) notes on a particular topic. The format clustering engine 116, in some implementations, associates a particular cluster or limited set of clusters within the cluster data 154 matching the unstructured data portion based upon similarity metric(s) with the unstructured data portion. In other implementations, the format clustering engine 116 may return identifiers of one or more formatting clusters to the unstructured data processing engine 114.

In some implementations, the unstructured data processing engine 114 provides the unstructured data portion(s) to a sentence clustering engine 118 for sentence text analysis. The text of unstructured data portion(s), for example, may be useful in identifying events or actions. The sentence clustering engine 118 may coordinate with a sentence parsing engine 128 to parse the text of the unstructured data portion.

In some embodiments, the sentence parsing engine 128 separates out each sentence of the unstructured data portion. For example, a "sentence" may be determined through punctuation or through text and/or formatting analysis to identify a "blurb" (e.g., a list of notes including bullets, etc.). The sentence parsing engine 128, for example, may apply a tokenizer to separate the unstructured data portion into sentences. Further, in some embodiments, for each sentence of the unstructured data portion, the sentence parsing engine 128 identifies terms and/or phrases and counts of each individual term and/or phrase within the sentence. The phrases may include common phrases used by claims handlers, medical professionals, law enforcement officers, vehicle inspectors, and/or others providing claims documentation. The sentence parsing engine 128 may provide a sentence data set including the term and/or phrase counts to the sentence clustering engine 118.

In some embodiments, text portions other than sentences are parsed by the sentence parsing engine 128 to determine a different or additional text data set for evaluation by the sentence clustering engine 118 or another clustering engine. In one example, terms in the unstructured data portion may be converted into vectors to identify synonyms. In another example, a set of topics may be identified within the unstructured data portion. Topics analysis, in an illustrative example, may be useful in identifying various topics captured in claim-related legal documents 150 or other structured reports including a set of topics.

Using the set of sentences from the sentence parsing engine 128, in some implementations, the sentence clustering engine 118 applies one or more clustering algorithms to match the set of sentences with a preexisting cluster. For example, clusters provided by a first clustering algorithm may be supplied to a second clustering algorithm to produce more fine-grained cluster information. In another example, different clustering algorithms with different goals (e.g., similar meaning terms clusters vs. phrase matching clusters) may be executed sequentially or in parallel to analyze the set of formatting data. The preexisting clusters, for example represented by the cluster data 154, represent other sentences suspected of containing similar information based on sentence term and/or phrasing similarity. The clustering algorithm(s), for example, may include agglomerative clustering, density-based spatial clustering of applications with noise (DBSCAN), or fast density peak clustering (DPeak). The clustering algorithm(s) may additionally consider a distance measure or similarity metric, representing the distance between the formatting of the unstructured data portion and the formatting represented by a given cluster. The distance measure may be a Euclidean or cosine distance, for example. In illustration, the distance measure can be varied to identify identical (e.g., standard formatted) notes, highly similar (e.g., template formatted) notes, or closely resembling (e.g., department or organizational trained style) notes on a particular topic. The sentence clustering engine 118, in some implementations, associates a particular cluster or limited set of clusters within the cluster data 154 matching each sentence of the unstructured data portion based upon similarity metric(s) with the particular sentence of the unstructured data portion. In other implementations, the sentence clustering engine 118 may return identifiers of one or more sentence clusters to the unstructured data processing engine 114.

In some implementations, the unstructured data processing engine 114 associates the unstructured data portion with the sentence cluster identifier(s) and the formatting cluster identifier(s). For example, the unstructured data portion (e.g., claim-related note 148, claim-related legal document 150, or claim-related handwritten document 152) may be associated with cluster data 154 within the data repository 110.

In other implementations, the unstructured data processing engine 114 provides the sentence cluster identifier(s) and the formatting cluster identifier(s) to an automatic labeling engine 120 to label the unstructured data portion with a selected label of a set of label data 156. The label data 156, in some illustrative examples, can include a liability analysis label, a contact with the insured label, a police report label, a receipt label, a medical record label, and/or an automobile inspection report label. The automatic labeling engine 120, for example, may label the unstructured data portion according to at least a portion of the sentence cluster identifier(s) and/or the formatting cluster identifier(s).

The automatic labeling engine 120, in some implementations, applies machine learning analysis to assign a label of the label data 156 to each unstructured data portion according to the sentence cluster identifier(s) and/or the formatting cluster identifier(s). For example, the automatic labeling engine 120 may provide the sentence cluster identifier(s) and/or the formatting cluster identifier(s) to a machine learning analysis engine 134.

In some implementations, the machine learning analysis engine 134 applies machine learning models. Each machine learning model may be trained to identify documents conforming to a label or set of labels of the label data according to at least a portion of the sentence cluster identifier(s) and/or the formatting cluster identifier(s). The machine learning models, for example, may have been trained via a training engine 132 designed to obtain truth data (e.g., manual confirmation or confirmation via derived information such as metadata components) of appropriate labeling of unstructured data. Further, certain models may be developed to analyze certain types of unstructured data, such as claim-related notes 148, claim-related legal documents 150, and/or claim-related handwritten materials 152.

Individual machine learning models of the machine learning analysis engine 134, in some implementations, further apply document metadata 160 and/or other metrics in analyzing the cluster identifiers of the unstructured data portions. As described above, if the original document formatting of the unstructured data portion included a metadata portion, the metadata may be retained as document metadata 160 associated with the unstructured data portion. The document metadata 160, in some examples, may include author and/or editor information, date information (e.g., original date, edited date, etc.), and/or location information (e.g., location at which a report of vehicle damage was obtained). Date information, in illustration, may be useful in identifying a processing phase of a set of processing phases 162 of the claims processing cycle at which the unstructured data portion was created or added to the claims data, while author or editor information may be useful in matching the unstructured data portion to a claimant record of claimant data 140 or a claims handler record of processing agent data 146. As illustrated in FIG. 3, the vehicle photos 302, for example, may include metadata identifying a date and/or location of capture.

In some implementations, a metrics engine 124 associates metrics with the unstructured data portion. The machine learning analysis engine 134, for example, may access metrics related to the unstructured data portion through the metrics engine 124. The metrics engine 124, in some examples, may identify a claims handler of the processing agent data 146 associated with the claim corresponding to the unstructured data portion, an employee level (e.g., agent, supervisor, etc.) of an author of the unstructured data portion, a claim status of claim status data 144, an open processing action of a set of processing actions 166, one or more closed processing actions of the set of processing actions 166, a length of time since claim initiation, one or more processing milestones of a set of processing milestones 164 associated with the claim, a type of claim and/or severity of the claim, a number of parties to the claim, and/or information regarding parties to the claim from claimant data 140. In some embodiments, the metrics engine 124 identifies other unstructured data portions associated with the same claim. A portion of the metrics, such as the type of claim and an initiation date, may be accessed from structured claims data 142 of the data repository 110. Further, a portion of the metrics, such as the length of time since claim initiation and/or the severity of the claim, may be derived from the structured claims data 142. For example, the severity of the claim may be determined through natural language processing of a loss description.

In some implementations, the machine learning engine 134 determines a corresponding label for the unstructured data portion within a threshold level of confidence. The threshold level of confidence, for example, may be programmed into tuning parameters of the machine learning models. The machine learning engine 134 may associate the label with the unstructured data portion or provide the label to the unstructured data processing engine 114 for further processing.

Certain labels of the label data 156 may be associated with processing actions 166 and/or processing milestones 164. In some implementations, the unstructured data processing engine 114 analyzes the assigned label in view of the structured claims data 142 and/or other metrics (e.g., generated by the metrics engine 124) to confirm appropriate handling of processing actions 166 and/or processing milestones 164 in accordance with the assigned label. If the label corresponding to the unstructured data portion represents a processing action or processing milestone that either needs to be implemented or appears to have missed being implemented in a timely manner in accordance with the metrics associated with the unstructured data portion, in some embodiments, the unstructured data processing engine 114 alerts an action assignment engine 122 so that an action can be assigned to one of the claims processing agents 108 or another client 104 (e.g., supervisor, etc.) for handling.

Certain labels of the label data 156 may be associated with predicted claim outcomes. In some implementations, the unstructured data processing engine 114 analyzes the assigned label in view of the structured claims data 142 and/or other metrics (e.g., generated by the metrics engine 124) to identify aspects of interest of a claim such as, in some examples, a total cost for the claim, a length in time of claim handling, the outcome of attorney oversight (e.g., settlement, arbitration, law suit, etc.), or a document length of one or more documents of the claim.

The machine learning engine 134, in some circumstances, may fail to identify a label corresponding to a particular unstructured data portion. In this circumstance, in some implementations, the machine learning engine 134 may provide information to a manual action review engine 130 to obtain manual labeling of the unstructured data portion. For example, a contact or group of contacts may be emailed, texted, or otherwise alerted of a failure to match the unstructured data portion of a label of the label data 156, resulting in manual label application. The manual review engine 130 may, in turn, identify the manual label information and corresponding unstructured data portion to the training engine 132 to automatically refine one or more machine learning models in accordance with the new truth data.

Figure 2A:
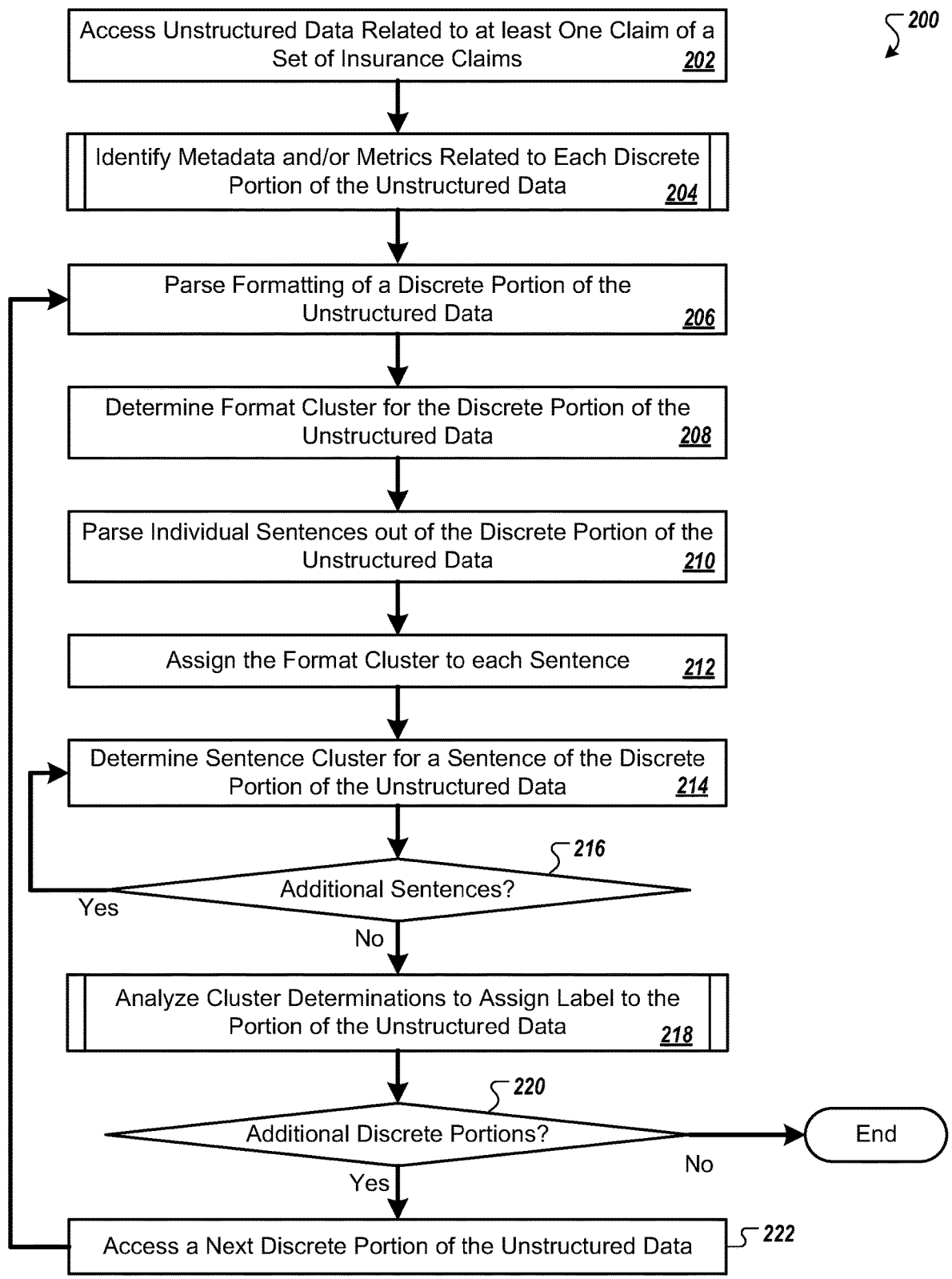
FIG. 2A is a flow chart of an example method for assigning unstructured data portions to clusters.
Figure 2B:
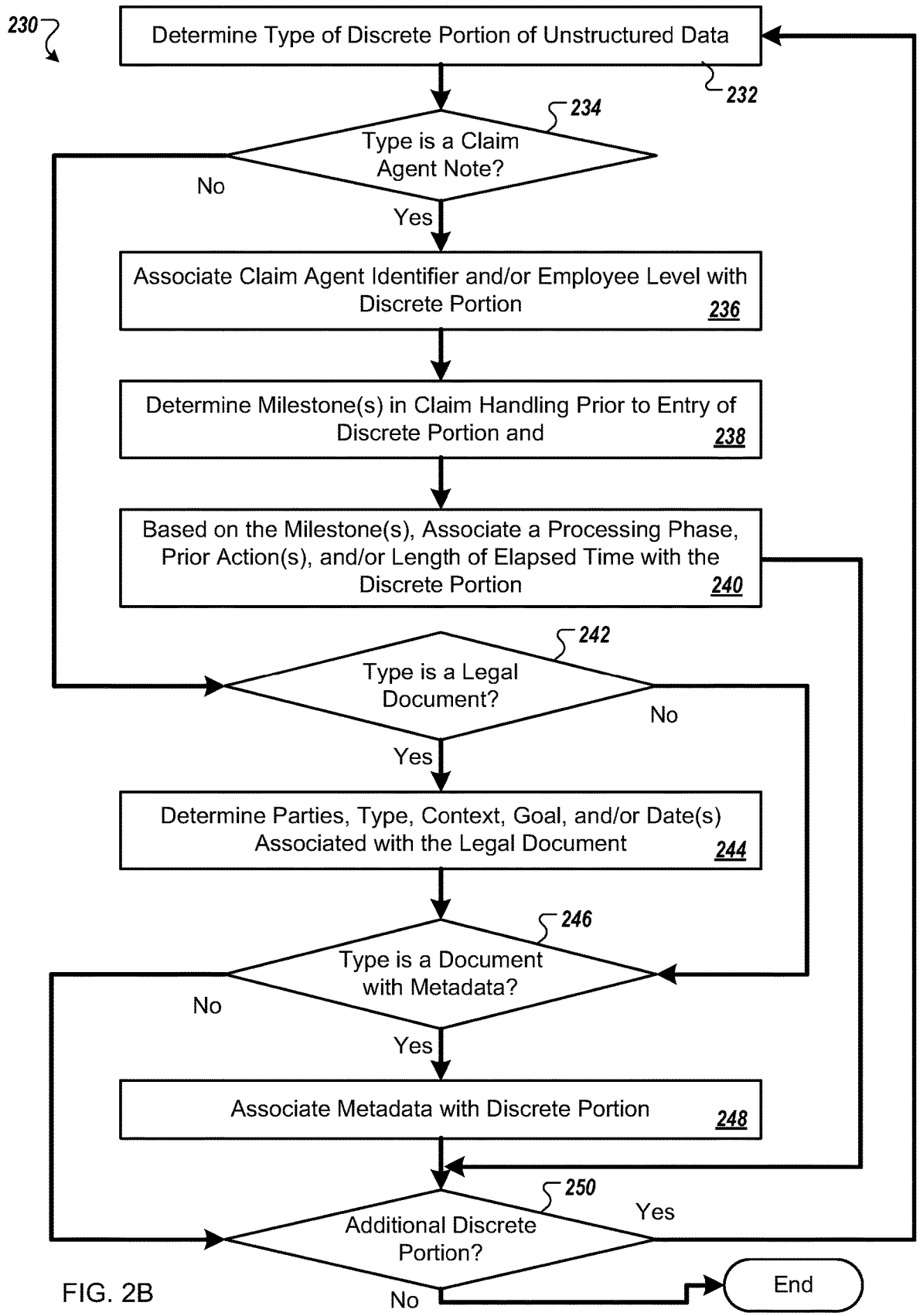
FIG. 2B is a flow chart of an example method for identifying supplemental data related to unstructured data portions.
Figure 2C:
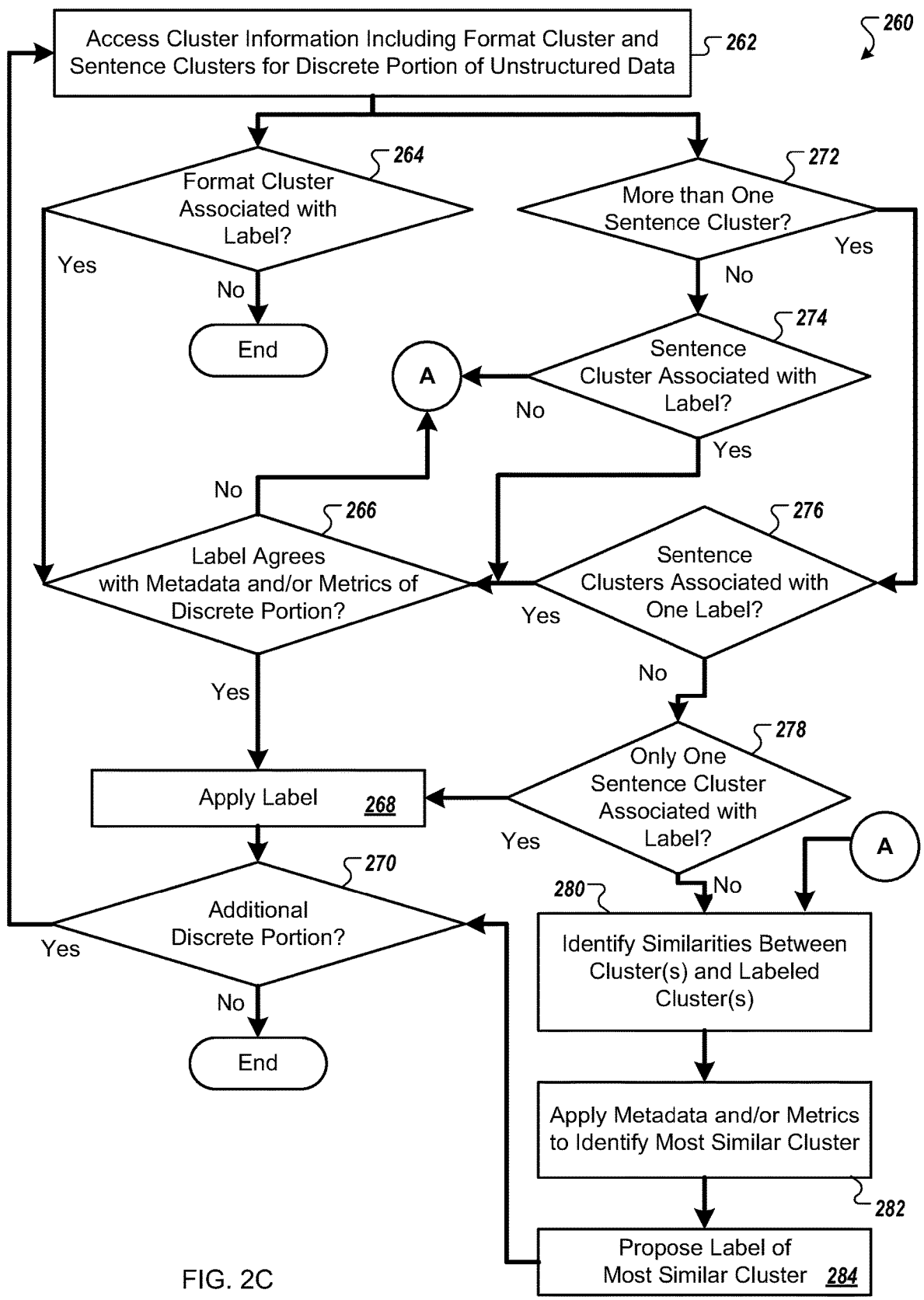
FIG. 2C is a flow chart of an example method for analyzing cluster assignments to automatically label unstructured data portions.

FIGS. 2A through 2C illustrate flow charts of an example method 200 and sub-methods for assigning unstructured data portions to clusters and then assigning a label based on the clusters. The methods, for example, may be performed by various engines of the claims processing platform 102 of FIG. 1.

Turning to FIG. 2A, in some implementations, the method 200 begins with accessing unstructured data related to at least one claim of a set of insurance claims 202). The unstructured data, for example, may be retained in one or more data sources, such as the data repository 110 of FIG. 1. The unstructured data processing engine 114 may access the unstructured data.

In some implementations, metadata and/or metrics related to each discrete portion of the unstructured data is identified (204). The metadata and/or metrics, in some examples, may provide information relevant to the purpose, origination, and/or position in the claims processing timeline (e.g., according to processing milestones 164 and/or processing phases 162, as discussed in relation to FIG. 1).

Turning to FIG. 2B, an example method 230 for identifying supplemental data (e.g., metadata and/or metrics, etc.) related to discrete data portions is provided. Portions of the method 230, for example, may be performed by the unstructured data processing engine 114 and/or the metrics engine 124 of FIG. 1.

In some implementations, the method 230 begins with determining a type of a discrete portion of unstructured data (232). The type, in some embodiments, is determined in part based on a storage location of the unstructured data portion. In some embodiments, the type is determined in part by the document type or file name extension (e.g., .txt, .doc, .pdf, .gif, etc.).

If the type is a claim agent note (234), in some implementations, a claim agent identifier representing the author of the note and/or an employee level of the author is associated with the unstructured data portion. The claim agent identifier and/or employee level, for example, may be cross-referenced in processing agent data 146. Associating the agent identifier and/or employee level with the unstructured data portion, for example, can include creating a database or logical link between the unstructured data portion and the processing agent information. In another example, the claim agent identifier and/or employee level may be added to document data 158 of the unstructured data portion (FIG. 1).

In some implementations, if the type of the unstructured data portion is a claim agent note, one or more milestones, events, and/or actions in claim handling that occurred (or were completed) prior to entry of the discrete portion are determined (238). For example, the milestones may include initial contact, property inspection, and/or resolution. The milestones may be determined, for example, based upon claim status data 144 and/or structured claims data 142, as illustrated in FIG. 1.

In some implementations, based on any milestones, events, and/or actions determined (238), a processing phase, prior action(s), and/or length of elapsed time is associated with the discrete portion (240). For example, an elapsed time between a most recent milestone, event, and/or action (e.g., opening of the claim) and the entry of the claim agent note may be calculated. In another example, a prior action (e.g., initial contact) may be associated with the claim agent note.

If the type of the discrete portion of unstructured data is, instead, a legal document (242), in some implementations, information is derived from text of the legal document such as, in some examples, one or more parties (e.g., companies, entities, and/or individuals) to a conflict or agreement, a type of legal document (e.g., insurance contract, rental contract, licensing terms, etc.), context surrounding the legal document, a goal of the legal document, and/or one or more dates associated with the legal document, such as an execution date or a performance date. The legal document, in some embodiments, is a standard form used by the claims processing platform 102 of FIG. 1. In this circumstance, the information may be derived by extracting information from set locations within the standard form. In other embodiments, the legal document is analyzed using natural language processing to obtain at least a portion of the information. A manual review may be flagged to insert missing information and/or to confirm automatically derived information. For example, the manual review engine 130 of FIG. 1 may schedule a manual review by a processing agent.

If the type of discrete portion of unstructured data includes metadata (246), in some implementations, the metadata is associated with the unstructured data portion (248). For example, the unstructured data processing engine 114 of FIG. 1 may store the metadata as document metadata 160.

In some implementations, the method 230 continues for each additional unstructured data portion (250).

Returning to FIG. 2A, in some implementations, formatting of the discrete portion of unstructured data is parsed (206). Format parsing, for example, may be performed as discussed in relation to the format parsing engine 126 of FIG. 1.

In some implementations, a format cluster is determined for the discrete portion of the unstructured data (208). The format cluster, for example, may be determined as discussed in relation to the format clustering engine 116 of FIG. 1.

In some implementations, individual sentences are parsed out of the discrete portion of the unstructured data (210). For example, the sentences may be parsed as described in relation to the sentence parsing engine 128 of FIG. 1.

In some implementations, the format cluster determined at step 208 is assigned to each sentence (212). The format cluster, for example, may be associated to each sentence parsed out of the unstructured data portion.

In some implementations, a sentence cluster is determined (214) for each sentence (216) of the unstructured data portion. The sentence cluster, for example, may be determined in a manner described in relation to the sentence clustering engine 118 of FIG. 1.

In some implementations, the cluster determinations are analyzed to assign a label to the unstructured data portion (218). The cluster determinations may be analyzed, for example, as described in relation to FIG. 2C.

Turning to FIG. 2C a flow chart of an example method 260 for analyzing cluster assignments to automatically label unstructured data portions is presented. Portions of the method 260, for example, may be performed by the claims processing platform 102 of FIG. 1.

In some implementations, the method 260 begins with accessing cluster information including the format cluster and the sentence cluster(s) assigned to a discrete portion of unstructured data (262). The cluster information, for example, may be accessed from the cluster data 154 of the data repository 110 of FIG. 1. The automatic labeling engine 120, in some embodiments, accesses the cluster information.

In some implementations, if the assigned format cluster is associated with a preexisting label (264) it is determined if the label agrees with metadata and/or metrics of the discrete portion (266). For example, document metadata 160 and/or document metrics (e.g., as described in relation to the metrics engine 124 of FIG. 1) may be analyzed in view of the preexisting label to confirm the preexisting label does not conflict in context with the metadata and/or metrics. For example, the label may relate to a police report, while the meta data identifies the document as a report provided by a vehicle repair shop. The preexisting label (264), in some implementations, is applied to the discrete portion of unstructured data (268). The label, for example, may be applied by the automatic labeling engine 120 by associating label data 156 with the document data 158.

In some implementations, if the label does not agree with the metadata and/or metrics of the discrete portion (266), similarities are identified between the format cluster(s) of the discrete portion of unstructured data and one or more labeled format clusters (280). In one example, the similarity may be identified using a distance function, such as Euclidean distance or cosine distance. The similarities, in another example, may be identified by a trained classification algorithm (e.g., machine learning classifier).

In some implementations, metadata and/or metrics are applied to identify the most similar cluster (282) out of two or more similar labeled format clusters identified at step 280. One or more classification algorithms, for example, may be trained to use the similarity of the clusters themselves and the metadata and/or metrics to determine the most similar cluster. If, conversely, only one similar labeled format cluster was identified, step 282 may be skipped.

In some implementations, the label of the most similar labeled format cluster is proposed as an appropriate label for the unstructured data portion (284). In some embodiments, proposing the label includes providing, via electronic communication, the label for review by a processing agent 108 of FIG. 1 or other member of the claims processing platform. For example, the proposed label and associated information may be made accessible to a user via a text message, email, or electronic messaging system in an interactive graphical interface supplied by the claims processing platform 102 of FIG. 1. In another example, the label may be added to a review queue for review by a selected user or group of users. In other embodiments, the label may be tentatively applied to the unstructured data portion with a flag for further review (e.g., for bulk manual review). For example, the label may be distinguished with a graphic, color-coding, or other visual marking such that a user may be led to double check the information.

Returning to step 264, in some implementations, if the format cluster is not associated with a label (264), it is determined whether the discrete portion of unstructured data is associated with more than one sentence cluster (272). If there is only one associated sentence cluster (274) and the sentence cluster is associated with a label (274), in some implementations, the method 260 follows the path of determining whether the label agrees with the metadata and/or metrics of the discrete portion (266) as described above.

In some implementations, if there is only one sentence cluster (272) and the cluster is not associated with a label (274), the method 260 follows the path beginning with identifying similarities between the sentence cluster and labeled sentence clusters (280).

If, instead, there is more than one sentence cluster associated with the unstructured data portion (272), and the sentence clusters are associated with a single label (e.g., only one of the sentence clusters is labeled, or two or more sentence clusters have the same label) (276), in some implementations, the method 260 follows the path of determining whether the label agrees with the metadata and/or metrics of the discrete portion (266) as described above.

Conversely, if there is more than one sentence cluster associated with the unstructured data portion (272), and the sentence clusters are associated with two or more labels, the method 260 follows the path beginning with identifying similarities between the sentence cluster and labeled sentence clusters (280).

In some implementations, the method 260 repeats (270) for each additional discrete portion of unstructured data.

Returning to FIG. 2A, in some implementations, if additional discrete portions of unstructured data are available for processing (220), a next discrete portion of unstructured data is accessed (222), and the method 200 returns to parsing the formatting of the discrete portion of unstructured data (206).

Figure 4:
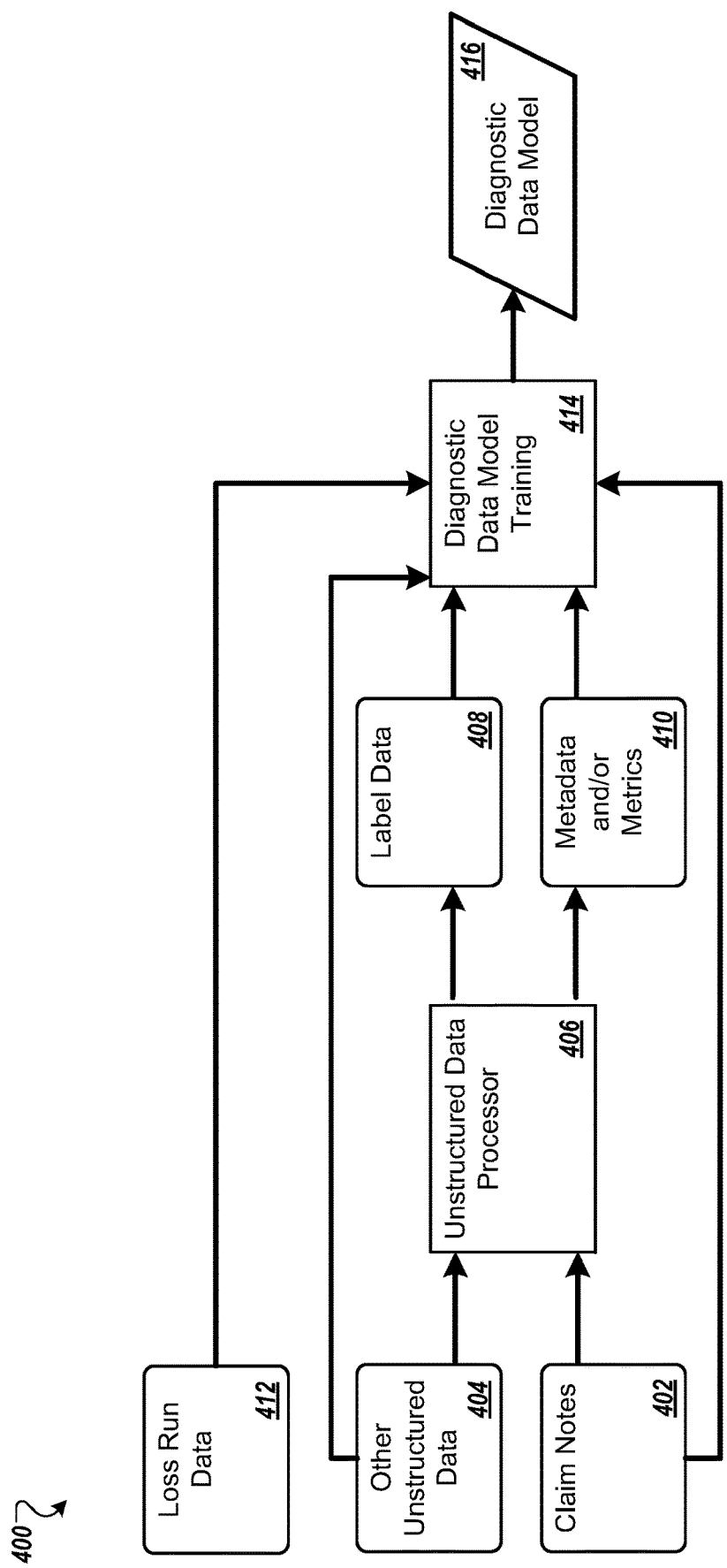
FIG. 4 is a flow diagram of an example process for training vulnerability detection data models using information derived from unstructured data portions.

Turning to FIG. 4, a flow diagram illustrates a process 400 for training vulnerability detection data models using information derived from both structured and unstructured data portions. In some implementations, claim notes 402 and other unstructured data 404 are extracted from closed insurance claims (e.g., for a given insurance provider or set of insurance providers) and used in combination with historical loss run data 412 to train a diagnostic data model 416 (e.g., for each provider or for providers in general). The loss run data 412, in some examples, may include loss amounts for indemnity, medical, reserve, and total losses, loss types, and a salvage total.

In some implementations, an unstructured data processor 406 analyzes the claim notes 402 and the other unstructured data 404 to determine label data 408 and metadata and/or metrics 410 associated with each type of unstructured data 402 and 404. The unstructured data processor 406, for example, may perform at least a portion of the analysis described in relation to the unstructured data processing engine 114 and related engines of the claims processing platform 102, as described in relation to FIG. 1. The unstructured data processor 406, for example, may perform at least a portion of the method 200 and its sub-methods 230 and/or 260, as described in relation to FIG. 2A to FIG. 2C.

In some implementations, the label data 408, metadata and/or metrics 410, and loss run data 412 are used by a diagnostic data model training module 414 to train the diagnostic data model 416. The diagnostic data model 416 may be trained to output a probability of an occurrence of a claim handling violation or other vulnerability in each phase of insurance claim processing. For example, the output of the diagnostic data model 416 may represent in a probabilistic manner the phases of the claim handling process that are likely to have violations or other vulnerabilities. By combining the label data 408 and metadata and/or metrics 410 with the original loss run data 412, for example, the diagnostic data model training module 414 may develop the diagnostic data model 416 by removing bias from the loss run data 412 while enlarging the data set used to train the diagnostic data model 416.

Figure 5:
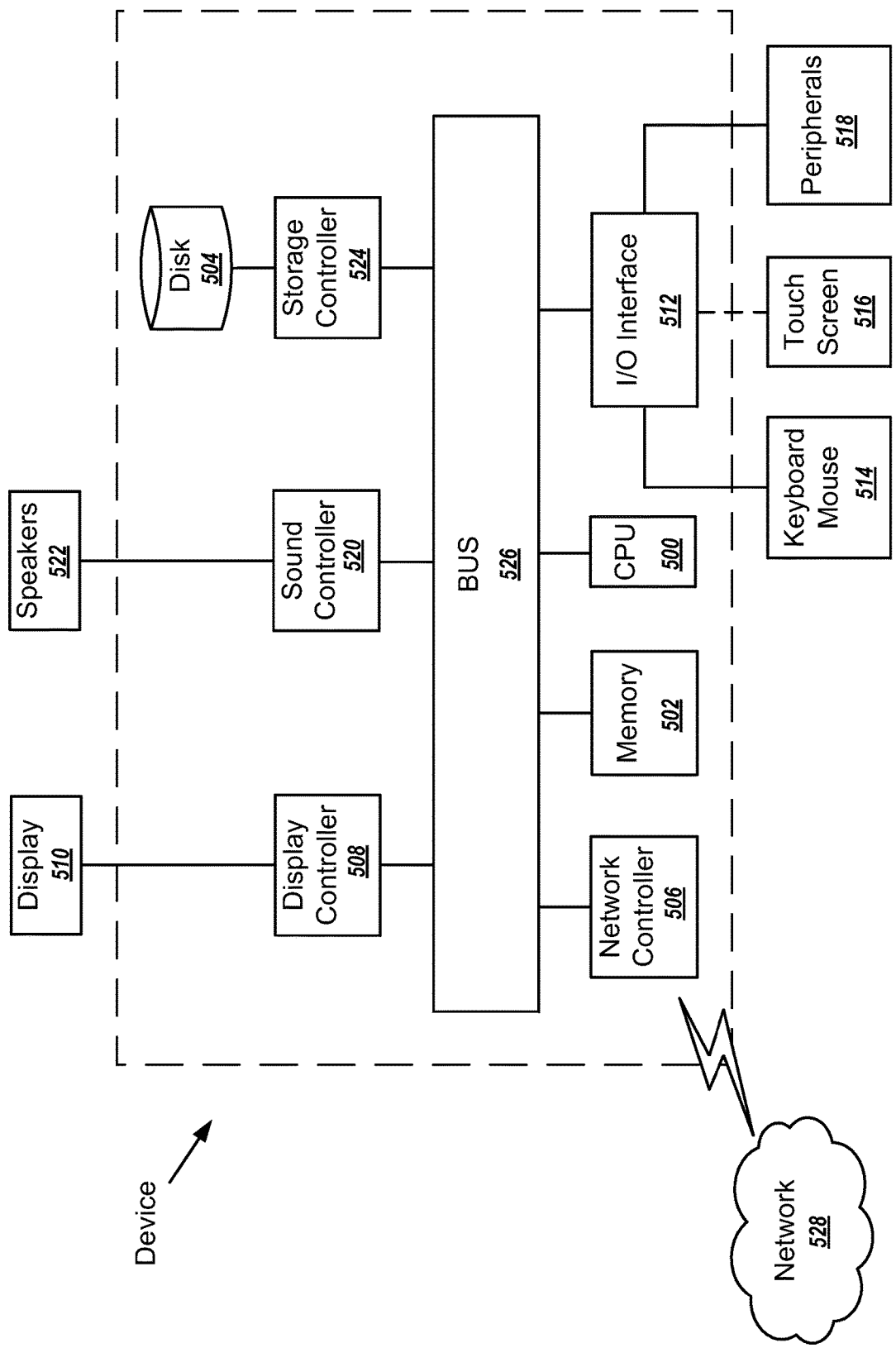
FIG. 5 is a block diagram of an example computing system.

Next, a hardware description of the computing device, mobile computing device, or server according to exemplary embodiments is described with reference to FIG. 5. The computing device, for example, may represent the clients 104, the claims data sources 106, the claims processing agents 108, or one or more computing systems supporting the functionality of the claims processing platform 102, as illustrated in FIG. 1. In FIG. 5, the computing device, mobile computing device, or server includes a CPU 500 which performs the processes described above. The process data and instructions may be stored in memory 502. The processing circuitry and stored instructions may enable the computing device to perform, in some examples, the methods 200, 230, and 260 of FIGS. 2A-2C and/or the process 400 of FIG. 4. These processes and instructions may also be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer. The storage medium disk 504, in some examples, may store the contents of the data repository 110 of FIG. 1.

Further, a portion of the claimed advancements may be provided as a utility application, background daemon, or component of an operating system, or combination thereof, executing in conjunction with CPU 500 and an operating system such as Microsoft Windows, UNIX, Solaris, LINUX, Apple MAC-OS and other systems known to those skilled in the art.

CPU 500 may be a Xenon or Core processor from Intel of America or an Opteron processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

The computing device, mobile computing device, or server in FIG. 5 also includes a network controller 506, such as an Intel Ethernet PRO network interface card from Intel Corporation of America, for interfacing with network 528. As can be appreciated, the network 528 can be a public network, such as the Internet, or a private network such as an LAN or WAN network, or any combination thereof and can also include PSTN or ISDN sub-networks. The network 528 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known. The network 528, for example, may support communications between the claims processing system 102 and any one of the clients 104, claims data sources 106, and claims processing agents 108.

The computing device, mobile computing device, or server further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface 512 also connects to a variety of peripherals 518 including printers and scanners, such as an OfficeJet or DeskJet from Hewlett Packard. The display controller 508 and display 510 may enable presentation of the user interface illustrated, for example, in FIG. 3.

A sound controller 520 is also provided in the computing device, mobile computing device, or server, such as Sound Blaster X-Fi Titanium from Creative, to interface with speakers/microphone 522 thereby providing sounds and/or music.

The general purpose storage controller 524 connects the storage medium disk 504 with communication bus 526, which may be an ISA, EISA, VESA, PCI, or similar, for interconnecting all of the components of the computing device, mobile computing device, or server. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 6:
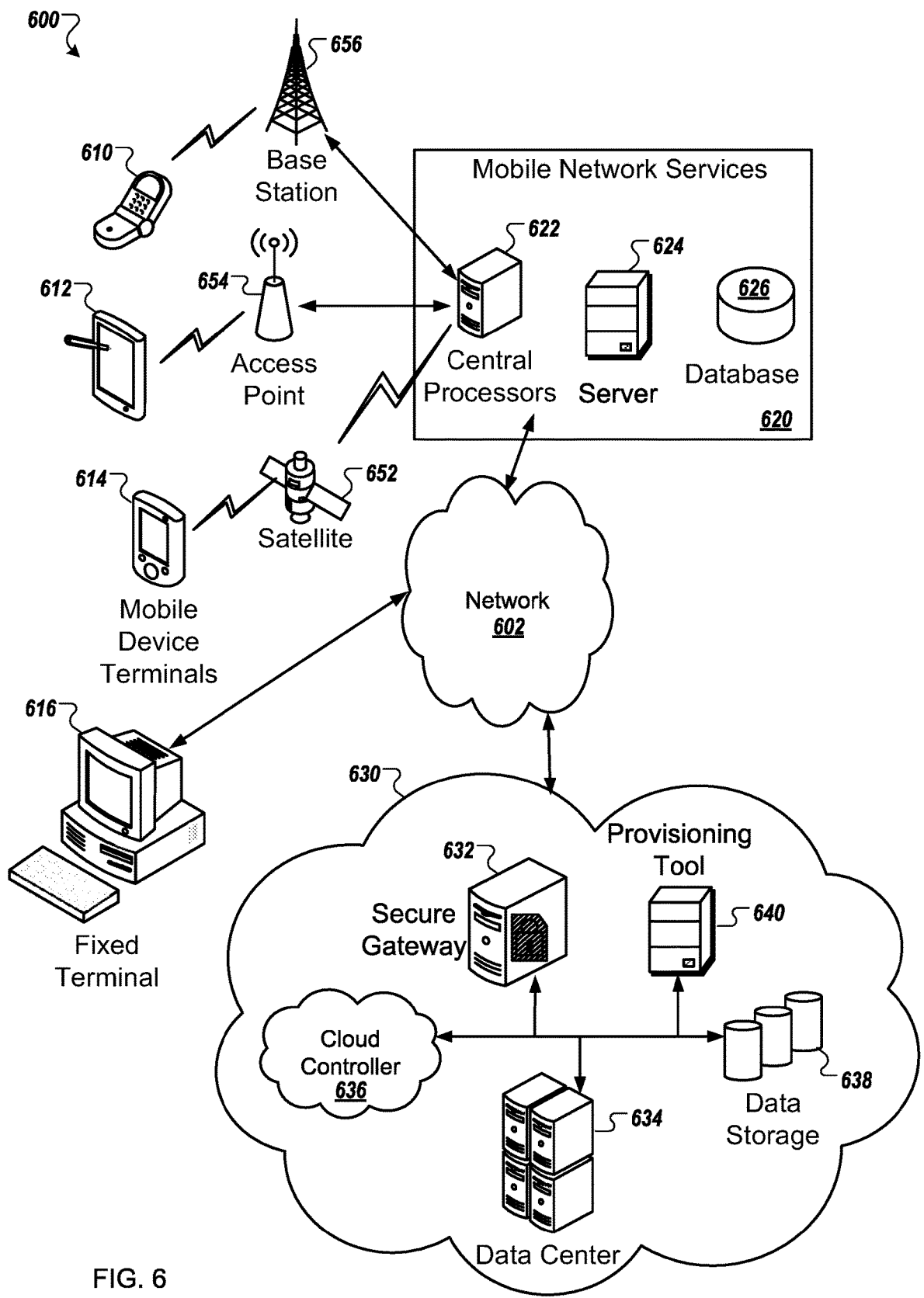
FIG. 6 is a block diagram of an example distributing computing environment including a cloud computing environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 6, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 630, such as Google Cloud Platform™ to perform at least portions of methods or algorithms detailed above. The processes associated with the methods described herein can be executed on a computation processor, such as the Google Compute Engine by data center 634. The data center 634, for example, can also include an application processor, such as the Google App Engine, that can be used as the interface with the systems described herein to receive data and output corresponding information. The cloud computing environment 630 may also include one or more databases 638 or other data storage, such as cloud storage and a query database. In some implementations, the cloud storage database 638, such as the Google Cloud Storage, may store processed and unprocessed data supplied by systems described herein. For example, various data represented as being stored in data repository 110 of FIG. 1, such as, in some examples, the claimant data 140, the structured claims data 142, the claim status data 144, the processing agent data 146, the claim-related notes 148, the claim-related legal documents 150, the claim-related handwritten materials 152, the cluster data 154, the label data 156, the document data 158, the document metadata 160, the processing phases 162, the processing milestones 164, and/or the processing actions 166 may be stored in a database structure such as the databases 638.

The systems described herein may communicate with the cloud computing environment 630 through a secure gateway 632. In some implementations, the secure gateway 632 includes a database querying interface, such as the Google BigQuery platform. The data querying interface, for example, may support access by the claims processing platform 102 (e.g., the unstructured data processing engine 114, training engine 132, and/or machine learning analysis engine 134) to data stored on any one of the clients 104 or claim data sources 106.

The cloud computing environment 630 may include a provisioning tool 640 for resource management. The provisioning tool 640 may be connected to the computing devices of a data center 634 to facilitate the provision of computing resources of the data center 634. The provisioning tool 640 may receive a request for a computing resource via the secure gateway 632 or a cloud controller 636. The provisioning tool 640 may facilitate a connection to a particular computing device of the data center 634.

A network 602 represents one or more networks, such as the Internet, connecting the cloud environment 630 to a number of client devices such as, in some examples, a cellular telephone 610, a tablet computer 612, a mobile computing device 614, and a desktop computing device 616. The network 602 can also communicate via wireless networks using a variety of mobile network services 620 such as Wi-Fi, Bluetooth, cellular networks including EDGE, 3G, 4G, and 5G wireless cellular systems, or any other wireless form of communication that is known. In some examples, the wireless network services 620 may include central processors 622, servers 624, and databases 626. In some embodiments, the network 602 is agnostic to local interfaces and networks associated with the client devices to allow for integration of the local interfaces and networks configured to perform the processes described herein. Additionally, external devices such as the cellular telephone 610, tablet computer 612, and mobile computing device 614 may communicate with the mobile network services 620 via a base station 656, access point 654, and/or satellite 652.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system for constructing a vulnerability data model based on automated analysis of data corresponding to a set of closed insurance claims, the system comprising:
   a plurality of pre-defined clusters, each cluster representing a grouping of natural language processing analysis results corresponding to a respective label of a set of pre-defined labels; and
   processing circuitry configured to perform a plurality of operations, the operations comprising,
      for each given claim of a set of closed insurance claims,
         accessing loss run data for the given claim and a plurality of unstructured-data portions associated with the given claim, including one or more unstructured-data portions representing data entry by one or more individuals associated with the given claim,
         for each given data portion of the accessed plurality of unstructured-data portions,
            applying an unstructured-data processor to the given data portion to identify, for the given data portion, a selected term cluster of the plurality of pre-defined clusters providing a closest match to a textual analysis of the given data portion, and
            associating, with the given data portion, the pre-defined label corresponding to the selected term cluster, and
         supplying, to a diagnostic data training module, the accessed loss run data, the pre-defined labels associated with each data portion of the accessed plurality of unstructured-data portions, and metadata associated with at least a subset of the plurality of accessed unstructured-data portions, and
      determining, by the diagnostic data training module and based on the loss run data, the pre-defined labels, and the metadata supplied to the diagnostic data training module for each claim of the set of closed insurance claims, a vulnerability model describing a probability of occurrence of one or more vulnerability types during each phase of a plurality of phases of insurance claim processing.

2. The system of claim 1, wherein the operations further comprise:
   accessing, for one or more of the set of closed insurance claims, structured claim note data; and
   supplying the structured claim note data for use in determining the vulnerability model.

3. The system of claim 1, wherein the loss run data for each respective claim of the set of closed insurance claims comprises one or more of a loss amount for indemnity, a medical cost, a reserve amount, a total of losses for the respective claim, an indication of one or more loss types for the respective claim, and a salvage total.

4. The system of claim 1, wherein the unstructured-data processor applies a textual analysis to the given data portion using operations comprising:
   applying natural language processing to a text component of the given data portion to obtain a set of term counts of words and/or phrases identified in the text component; and
   applying at least one clustering algorithm to the set of term counts to determine a term cluster for the text component.

5. The system of claim 1, wherein
each label of at least a portion of the set of pre-defined labels relates to at least one of a type of content in an unstructured-data portion or a type of action taken by an individual associated with the unstructured-data portion.

6. The system of claim 1, wherein identifying the selected term cluster providing the closest match comprises identifying the selected term cluster providing the closest match in view of a metadata component of the given data portion.

7. The system of claim 6, wherein identifying the selected term cluster in view of the metadata component comprises determining whether information of the metadata component conflicts with a context of the pre-defined label corresponding to the selected term cluster providing the closest match.

8. The system of claim 6, wherein the metadata component comprises at least one of an author, an editor, date information, or location information.

9. The system of claim 6, wherein identifying the selected term cluster in view of the metadata component comprises accessing one or more metrics corresponding to one or more elements of the metadata component.

10. The system of claim 9, wherein the one or more metrics comprises one or more of a user identifier, an employee level, a processing phase, a prior action, a length of elapsed time, or a party to a legal document.

11. A method for constructing a vulnerability data model based on automated analysis of data corresponding to a set of closed insurance claims, the method comprising:
accessing, by processing circuitry from a non-transitory computer readable medium, a plurality of pre-defined clusters, each cluster representing a grouping of natural language processing analysis results corresponding to a respective label of a set of pre-defined labels; and
for each given claim of a set of closed insurance claims,
accessing, by the processing circuitry, loss run data for the given claim and a plurality of unstructured-data portions associated with the given claim, including one or more unstructured-data portions representing data entry by one or more individuals associated with the given claim, and
for each given data portion of the accessed plurality of unstructured-data portions,
applying, by the processing circuitry, unstructured-data processing to the given data portion to identify, for the given data portion, a selected term cluster of the plurality of pre-defined clusters providing a closest match to a textual analysis of the given data portion, and
associating with the given data portion, by the processing circuitry, the pre-defined label corresponding to the selected term cluster, and
supplying, to a diagnostic data training module, the accessed loss run data, the pre-defined labels associated with each data portion of the accessed plurality of unstructured-data portions, and metadata associated with at least a subset of the plurality of accessed unstructured-data portions; and
determining, by the diagnostic data training module and based on the loss run data, the pre-defined labels, and the metadata supplied to the diagnostic data training module for each claim of the set of closed insurance claims, a vulnerability model describing a probability of occurrence of one or more vulnerability types during each phase of a plurality of phases of insurance claim processing.

12. The method of claim 11, further comprising:
accessing, by the processing circuitry for one or more of the set of closed insurance claims, structured claim note data; and
supplying the structured claim note data for use in determining the vulnerability model.

13. The method of claim 11, wherein the loss run data for each respective claim of the set of closed insurance claims comprises one or more of a loss amount for indemnity, a medical cost, a reserve amount, a total of losses for the respective claim, an indication of one or more loss types for the respective claim, and a salvage total.

14. The method of claim 11, wherein applying the unstructured-data processing comprises applying a textual analysis to the given data portion using operations comprising:
applying natural language processing to a text component of the given data portion to obtain a set of term counts of words and/or phrases identified in the text component; and
applying at least one clustering algorithm to the set of term counts to determine a term cluster for the text component.

15. The method of claim 14, further comprising parsing, by the processing circuitry, individual sentences of the unstructured-data portion, wherein:
obtaining the set of term counts comprises obtaining a respective set of term counts of each sentence of one or more sentences of the unstructured-data portion; and
applying the at least one clustering algorithm comprises applying the at least one clustering algorithm to each sentence of the one or more sentences.

16. The method of claim 11, wherein
each label of at least a portion of the set of pre-defined labels relates to at least one of a type of content in an unstructured-data portion or a type of action taken by an individual associated with the unstructured-data portion.

17. The method of claim 11, wherein identifying the selected term cluster providing the closest match comprises identifying the selected term cluster providing the closest match in view of a metadata component of the given data portion.

18. The method of claim 17, wherein identifying the selected term cluster in view of the metadata component comprises determining whether information of the metadata component conflicts with a context of the pre-defined label corresponding to the selected term cluster providing the closest match.

19. The method of claim 17, wherein identifying the selected term cluster in view of the metadata component comprises accessing one or more metrics corresponding to one or more elements of the metadata component.

20. The method of claim 19, wherein the one or more metrics comprises one or more of a user identifier, an employee level, a processing phase, a prior action, a length of elapsed time, or a party to a legal document.

\* \* \* \* \*